US012731364B2

(12) United States Patent
Shi

(10) Patent No.: US 12,731,364 B2
(45) Date of Patent: Sep. 8, 2026

(54) IMAGE PROCESSING METHOD AND APPARATUS

(71) Applicant: Beijing Zitiao Network Technology Co., Ltd., Beijing (CN)

(72) Inventor: Lei Shi, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 325 days.

(21) Appl. No.: 18/573,564

(22) PCT Filed: Sep. 8, 2022

(86) PCT No.: PCT/CN2022/117897
§ 371 (c)(1),
(2) Date: Dec. 22, 2023

(87) PCT Pub. No.: WO2023/036257
PCT Pub. Date: Mar. 16, 2023

(65) Prior Publication Data
US 2024/0290060 A1 Aug. 29, 2024

(30) Foreign Application Priority Data
Sep. 13, 2021 (CN) ......................... 202111066745.4

(51) Int. Cl.
*G06T 3/00* (2024.01)
*G06T 3/40* (2006.01)
(Continued)

(52) U.S. Cl.
CPC ................ *G06V 10/25* (2022.01); *G06T 3/40* (2013.01); *G06T 7/40* (2013.01); *G06V 10/54* (2022.01); *G06T 2207/20132* (2013.01)

(58) Field of Classification Search
CPC .......... G06V 10/25; G06V 10/54; G06T 3/40; G06T 7/40; G06T 2207/20132; G06T 3/00; G06T 7/10; H04N 5/262; H04N 21/431
See application file for complete search history.

(56) References Cited

U.S. PATENT DOCUMENTS 11,328,693 B2 * 5/2022 Sun ....................... G06F 3/0485
12,417,513 B2 * 9/2025 Bakar ...................... G09G 3/20
(Continued)

FOREIGN PATENT DOCUMENTS

CN 103020900 A 4/2013
CN 103841330 A 6/2014
(Continued)

OTHER PUBLICATIONS

ISA China National Intellectual Property Administration, International Search Report and Written Opinion Issued in Application No. PCT/CN2022/117897, Nov. 28, 2022, WIPO, 10 pages.

*Primary Examiner* — Aaron W Carter
(74) *Attorney, Agent, or Firm* — Alleman Hall LLP

(57) ABSTRACT

An image processing method and apparatus, relating to the technical field of image processing. The method comprises: calling an image acquisition device by means of an application program to obtain first image data; cropping the first image data to second image data, the ratio of the first image data being different from that of the second image data, the ratio of the first image data being a ratio supported by the image acquisition device, and the ratio of the second image data being a ratio supported by the application program; performing effect processing on the second image data; and performing first processing on the second image data subjected to effect processing, the first processing comprising at
(Continued)

least one of displaying in an interface of the application program, encoding, and storing.

18 Claims, 5 Drawing Sheets

(51) Int. Cl.
*G06T 7/40* (2017.01)
*G06V 10/25* (2022.01)
*G06V 10/54* (2022.01)

(56) References Cited

U.S. PATENT DOCUMENTS

2006/0188173 A1* 8/2006 Zhang .................. H04N 7/0122 348/E5.111
2008/0192166 A1* 8/2008 Wong ....................... H04N 5/64 349/58
2008/0259094 A1* 10/2008 Kim ........................ G06T 3/602 345/651
2009/0251594 A1* 10/2009 Hua ................... H04N 21/2662 348/E7.003
2010/0080528 A1* 4/2010 Yen ........................ G11B 27/34 386/278
2011/0234640 A1* 9/2011 Ishida .................. H04N 23/611 345/671
2011/0234852 A1* 9/2011 Ishida .................. H04N 23/698 348/E5.024
2013/0082960 A1* 4/2013 Otake ....................... G06T 3/40 345/173
2013/0175913 A1* 7/2013 Kim .......................... G09F 9/33 312/324
2015/0206284 A1* 7/2015 Yang ..................... G06F 1/1681 345/659
2015/0363915 A1* 12/2015 Li ..................... H04M 1/72454 345/649
2017/0041472 A1* 2/2017 Steadman ............. H04W 84/18
2018/0278855 A1* 9/2018 Li ........................ H04N 23/698
2020/0068138 A1* 2/2020 Gandhi .................. H04N 23/45
2021/0020144 A1* 1/2021 Sun ....................... G06F 3/0346
2021/0209721 A1* 7/2021 Peng ......................... G06T 1/20
2021/0293371 A1* 9/2021 Choi .................... F16M 11/105
2021/0398333 A1* 12/2021 Kalu .................... H04N 5/2628
2022/0108541 A1* 4/2022 Ozone .................. H04N 23/683
2023/0252758 A1* 8/2023 Cao ........................... G06T 1/60 345/582
2024/0054691 A1* 2/2024 Liu ......................... G06T 11/00
2024/0290060 A1* 8/2024 Shi ....................... H04N 21/431
2025/0232450 A1* 7/2025 Zhu ........................... G06T 7/13
2025/0245782 A1* 7/2025 Morimoto ................. G06T 3/60
2025/0328990 A1* 10/2025 Lu .......................... H04N 5/262

FOREIGN PATENT DOCUMENTS

CN 106937043 A 7/2017
CN 109819187 A 5/2019
CN 111356000 A 6/2020
CN 111415399 A 7/2020
CN 112073765 A 12/2020
JP 2014050027 A 3/2014
WO 2019041226 A1 3/2019

* cited by examiner

IMAGE PROCESSING METHOD AND APPARATUS

CROSS REFERENCE TO RELATED APPLICATIONS

The present application is a U.S. National Stage Application of PCT Application Serial No. PCT/CN2022/117897, filed Sep. 8, 2022, which claims a priority right to the Chinese patent application No. 202111066745.4 entitled "Image Processing Method and Apparatus" filed with the Chinese Patent Office on Sep. 13, 2021, the entire disclosure of which is hereby incorporated by reference in their entireties.

FIELD

Embodiments of the present disclosure relate to the field of image processing technologies, and particularly to an image processing method and apparatus.

BACKGROUND

With the rapid development of electronic devices, the electronic devices are increasingly powerful in functions. The electronic device may be provided with an image acquisition device to capture an image or to capture a video comprising an image. Various applications may also be run on the electronic device, and the applications may call the image acquisition device of the electronic device to realize image capturing or video capturing, and the captured images may be displayed and stored by the applications.

In the above scheme, how to reduce the computational complexity when the application captures an image or video is an urgent problem to be solved.

SUMMARY

Embodiments of the present disclosure provide an image processing method and apparatus, which may reduce the computational complexity upon recording image or videos by an application.

In a first aspect, embodiments of the present disclosure provide an image processing method, comprising:

- calling an image acquisition device by an application program to obtain first image data;
- cropping the first image data into second image data, an ratio of the first image data being different from that of the second image data, the ratio of the first image data being a ratio supported by the image acquisition device, and the ratio of the second image data being an ratio supported by the application program;
- performing effect processing on the second image data;
- performing first processing on the second image data subjected to the effect processing, the first processing comprising at least one of displaying in an interface of the application, encoding and storing.

In a second aspect, embodiments of the present disclosure provide a video processing apparatus, comprising:

- an image data obtaining module configured to call an image acquisition device to obtain first image data by an application;
- an image cropping module configured to crop the first image data into second image data, an ratio of the first image data being different from that of the second image data, the ratio of the first image data being a ratio supported by the image acquisition device, and the ratio of the second image data being an ratio supported by the application;

- an effect processing module configured to perform effect processing on the second image data;
- a first processing module configured to perform first processing on the second image data subjected to the effect processing, the first processing comprising at least one of displaying the second image data in an interface of the application, encoding and storing the second image data.

In a third aspect, embodiments of the present disclosure provide an electronic device comprising: at least one processor and a memory;

- the memory stores computer-executable instructions;
- the at least one processor executes the computer-executable instructions stored in the memory, to cause the electronic device to implement the method according to the first aspect.

In a fourth aspect, embodiments of the present disclosure provide a computer-readable storage medium having stored therein computer-executable instructions which, when executed by a processor, cause a computing device to implement the method according to the first aspect.

In a fifth aspect, embodiments of the present disclosure provide a computer program for implementing the method according to the first aspect.

In a sixth aspect, embodiments of the present disclosure provide a computer program product comprising computer instructions for implementing the method according to the first aspect.

Embodiments of the present disclosure provide the image processing method and apparatus. The method comprises: calling an image acquisition device to obtain first image data by an application program; cropping the first image data into second image data, an ratio of the first image data being different from that of the second image data, the ratio of the first image data being an ratio supported by the image acquisition device, and the ratio of the second image data being an ratio supported by the application; performing effect processing on the second image data; performing first processing on the second image data subjected to the effect processing, the first processing comprising at least one of displaying in an interface of the application, encoding and storing. According to embodiments of the present disclosure, the first image data may be crop at one time before the effect processing, displaying and storing. As such, the amount of data to be processed upon effect processing may be reduced, thereby reducing the computational complexity of effect processing, and finally reducing the computational complexity during image recording or video recording. Furthermore, compared with cropping twice in the prior art, the one-time cropping in the present disclosure also helps to reduce computational complexity upon recording images or videos.

BRIEF DESCRIPTION OF THE DRAWINGS

Figures to be used in the depictions of embodiments or prior art will be introduced briefly in order to illustrate technical solutions of embodiments of the present disclosure or the prior art more clearly. It is obvious that the figures in the following depictions are merely some embodiments described in the present description, and those skilled in the art can further obtain other figures according to these figures without making any inventive efforts.

DETAILED DESCRIPTION OF EMBODIMENTS

To make the objectives, technical solutions and advantages of embodiments of the present disclosure more apparent, the technical solutions in embodiments in the disclosure will be described below clearly and completely with reference to figures in the embodiments of the disclosure. Obviously, the described embodiments are only partial embodiments in the disclosure rather than all embodiments. All other embodiments obtained by those skilled in the art without making inventive efforts based on the embodiments in the disclosure should fall within the scope of protection of the present disclosure.

Figure 1:
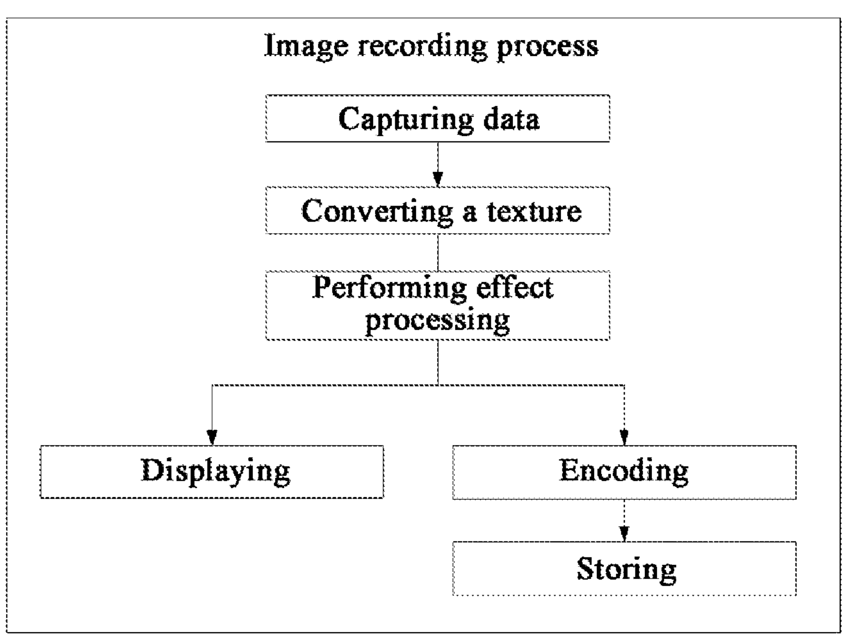
FIG. 1 schematically illustrates a schematic diagram of an image capture process for an application to which embodiments of the present disclosure are applicable.

Embodiments of the present disclosure may be applied in an image capture process of an application. FIG. 1 schematically illustrates a schematic diagram of an image capturing process for an application. With reference to FIG. 1, an image capturing process mainly comprises the following steps: capturing data, converting a texture, performing an effect process, displaying, encoding and storing.

The capturing data means calling an image acquisition device to capture image data. The image acquisition device may include but not limited to: a camera, a mobile phone and a surveillance camera.

The converting a texture means converting a texture type of image data, wherein the texture type refers to a manner of representing a texture. For example, the texture type of the image data may be converted from an OES texture to a two-dimensional texture.

The performing an effect process means adding an effect to image data with a two-dimensional texture, including modifying a color, adding a word, adding an effect picture, etc.

The displaying means rendering the image data after the effect process or after texture conversion into a screen.

The encoding means compressing the image data after the effect process or after texture conversion to reduce the storage space of the image data.

The storing means storing the encoded image data in the form of a file, the image data obtained by different compression algorithms corresponding to different file formats. According to different compression algorithms, the file format may include but not limited to: joint photographic experts group (JPEG), tag image file format (TIF), bitmap (BMP), raw (RAW), etc.

In the prior art, upon displaying, if it is found that an ratio of the image data captured by the image acquisition device is inconsistent with a target ratio of the image data supported by the application program, the image data captured by the image acquisition device may be crop into the target ratio and then displayed in the application. Likewise, when the storage is performed, if it is found that the ratio of the image data captured by the image acquisition device is not consistent with the target ratio, the image data captured by the image acquisition device may be crop into the target ratio and then encoded and stored. The target ratio may be the ratio supported by the application program or the ratio set by the user in the application program.

It can be seen that in the above solution, the image data is crop after the effect processing, which causes a large amount of data for the effect processing, further causes a longer time period spent in the effect processing, and finally causes a longer time period spent in recording images or videos.

In order to solve the above-mentioned problem, in the embodiments of the present disclosure, first image data captured by the image acquisition device may be crop before performing effect processing to obtain second image data, so as to perform effect processing, display, encoding and storage on the second image data. In this way, the amount of data to be processed during effect processing may be reduced, thereby reducing the computational complexity of effect processing, and finally reducing the computational complexity during image recording or video recording. Furthermore, as compared with cropping twice, the one-time cropping in the present disclosure also helps to reduce computational complexity upon recording images or videos.

As may be appreciated, as the computational complexity is reduced, the time period spent in recording images or videos is also reduced.

The technical solutions of the embodiments of the present disclosure and how the technical solutions of the present disclosure solve the above-mentioned technical problems will be described in detail in the following specific embodiments. The following specific embodiments may be combined with one another, and the same or similar concepts or processes might not be repeated in some embodiments any longer. Embodiments of the present disclosure will now be described with reference to the accompanying drawings.

Figure 2:
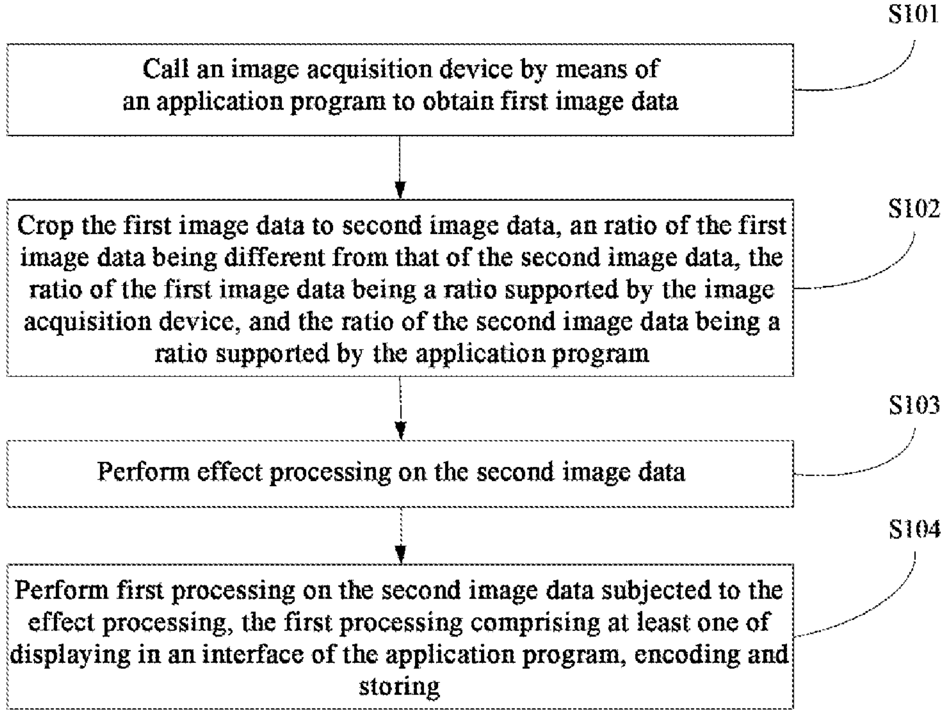
FIG. 2 schematically illustrates a flow chart of steps of an image processing method provided by an embodiment of the present disclosure.

FIG. 2 schematically illustrates a flow chart of steps of an image processing method provided by an embodiment of the present disclosure. The method shown in FIG. 2 may be applied in an electronic device, and with reference to FIG. 2, the image processing method comprises:

S101: calling an image acquisition device by means of an application program to capture first image data.

The application refers to any program that may record images and use the images. For example, a social application program may send out the recorded images.

The application program runs on a terminal device. When recording images, the application program firstly calls an image acquisition device of the terminal device to obtain first image data, and then process the first image data, and then display or store the first image data in the application program.

The above image acquisition device pre-sets at least one candidate ratio, and selects one candidate ratio therefrom as the ratio of the first image data.

In one embodiment, the first image data corresponds to a first texture which is a texture supported when the image acquisition device displays the images. For example, the first texture is typically an OES texture.

S102: crop the first image data into second image data, the ratio of the first image data is different from that of the second image data, the ratio of the first image data is a ratio supported by the image acquisition device, and the ratio of the second image data is an ratio supported by the application.

It may be appreciated that the ratio of the second image data used by the application is different from that of the first image data used by the image acquisition device. For example, the ratio of the first image data may be 2:1, i.e., a ratio of a width to a height of the image corresponding to the first image data is 2:1, and the ratio of the second image data may be 1:1, i.e., a ratio of the width to the height of the image corresponding to the second image data is 1:1. As another example, the ratio of the first image data may be 1:1, i.e., a ratio of the width to the height of the image corresponding to the first image data is 1:1, and the ratio of the second image data may be 2:1, i.e., a ratio of the width to the height of the image corresponding to the second image data is 2:1.

When the ratios of the first image data and the second image data are different, the first image data needs to be crop to the second image data.

In embodiments of the present disclosure, the texture when the application program displays the image may be the same as or different from the first texture. When they are different, the texture of the application is referred to as a second texture. At this time, the image data needs to be converted from the first texture to the second texture. The second texture is usually a two-dimensional texture.

In one embodiment, the above cropping process described above may be integrated into the texture conversion process. The integration of the cropping process with the texture conversion process further reduces the processing steps needed by the image processing as compared with cropping the first image data separately, thereby further reducing the time period spent in recording image or videos.

When the cropping process and the texture conversion process are integrated, texture type conversion is performed on only part of pixels in the first image data, and this part of pixels are determined according to the ratio of the second image data. Specifically, a target region may be determined in the first image data according to the ratio of the second image data; then, the texture of the target region is converted from a first type to a second type to obtain second image data constituted by the target region. The first type is a texture type supported when the image acquisition device performs image displaying, and the second type is a texture type supported when the application program performs image displaying.

Here, the first type may be an OES texture and the second type may be a two-dimensional texture.

Figure 3:
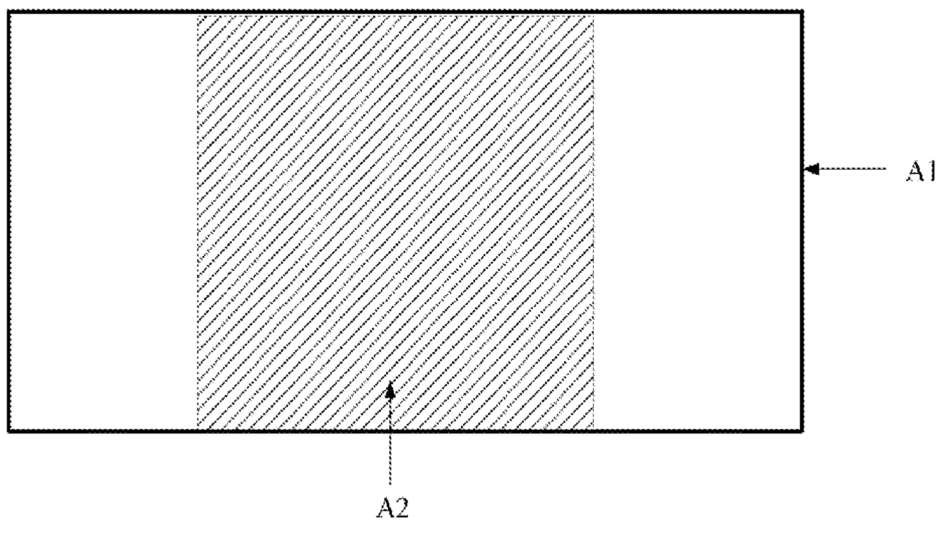
FIG. 3 and FIG. 4 schematically illustrate two ratio relationships between a first image data and a target region.
Figure 4:
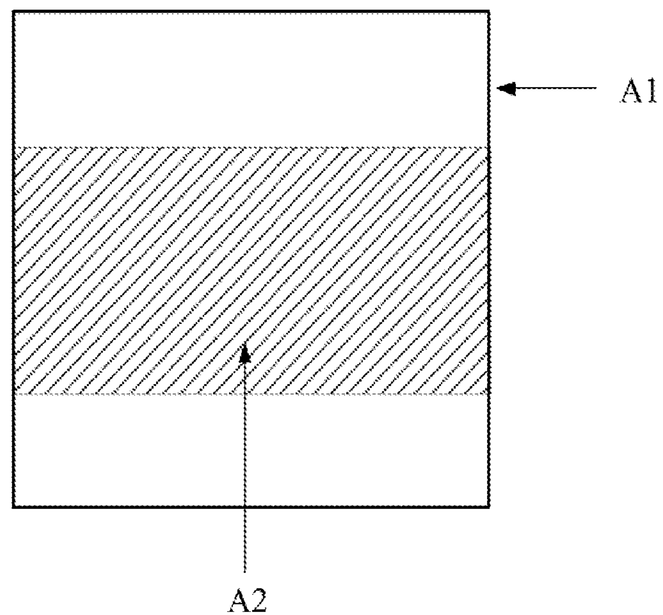

The target region is a pixel region in the first image data, which has the largest area and a ratio of the second image data. Therefore, it is possible to ensure as much as possible that the obtained second image data retains the most image information, and the clarity of the second image data is improved. FIG. 3 and FIG. 4 schematically illustrate two ratio relationships between the first image data and the target region. Referring to FIG. 3 or FIG. 4, a region A1 formed by a thick line is an image region corresponding to the first image data, and a region A2 formed by a shaded portion is the target region.

Referring to FIG. 3, A1 has a width to height ratio 2:1, that is, the ratio of the first image data is a ratio 2:1 of the height of the first image data to the width of the first image data, and the width to height ratio of the target region is equal to the ratio 1:1 of the second image data. It may be seen that the height of the target region in FIG. 3 is the same as the height of the first image data, and the width of the target region is smaller than the width of the first image data. It may be appreciated that the target region shown in FIG. 3 is located at a middle position of an image region to which the first image data corresponds. In practical application, the target region may move horizontally in the direction of the width.

Referring to FIG. 4, a width to height ratio of A1 is 1:1, and the width to height ratio of the target region is equal to the ratio of the second image data 2:1. It can be seen that the width of the target region in FIG. 4 is the same as the width of the first image data, and the height of the target region is smaller than the height of the first image data. It may be appreciated that the target region shown in FIG. 4 is located at a middle position of an image region to which the first image data corresponds. In practical application, the target region may move vertically in the direction of height.

In summary, referring to FIG. 3, in order to maximize the area of the target region, when the ratio of the first image data is larger than that of the second image data, the height of the target region is equal to that of the first image data. Referring to FIG. 4, in order to maximize the area of the target region, when the ratio of the first image data is smaller than that of the second image data, the width of the target region is equal to that of the first image data.

In practical application, when the target region is selected, it is also necessary to determine the target region according to key image information in the first image data, so that the target region includes the key image information. The key image information may comprise: human face, human body, animal, building, etc.

S103: performing effect processing for the second image data.

The effect processing may include, but not limited to: changing a color, adding a text, adding an effect picture, etc.

S104: performing first processing on the second image data subjected to the effect processing, the first processing comprising at least one of: displaying in an interface of the application, encoding and storing.

It may be appreciated that the two step of displaying in the interface of the application program and the step of storing in a storage region corresponding to the application program are independent from each other and do not affect each other.

The encoding and storing may comprise: firstly, encoding the second image data to obtain an image file; then storing the image file into a corresponding storage region of the application program.

The storage region may be a storage region divided for an application program on the terminal device and be used for storing data generated by the application program during running. The storage region may be a memory, a cache or a magnetic disk.

In one embodiment, the ratio of the second image data may be adjusted before cropping the first image data into the second image data. Two manners of adjusting the ratio of the second image data are described in detail below.

In a first manner, when a screen rotation angle is greater than or equal to a preset angle threshold, the ratio of the second image data is adjusted.

The screen rotation angle is an angle of a screen of a terminal device running the above application during the rotation, and the rotation may be performed by a user. The preset angle threshold value may be set according to an actual application scenario. For example, the preset angle threshold may be 90 degrees, so that when the user adjusts the terminal device from a horizontal screen to a vertical screen, or adjusts the terminal device from the vertical screen to the horizontal screen, the ratio of the second image data may be adjusted.

Specifically, the ratio of the second image data may be determined by the width to height ratio of the terminal device after the terminal device is rotated. In one embodiment, the ratio of the second image data is close to, or even the same as the height to width ratio of the terminal device. For example, if the width to height ratio of the terminal device is 1:2, when the terminal device is adjusted from the horizontal screen to the vertical screen, the ratio of the second image data is also adjusted from 2:1 to 1:2; when the terminal device is adjusted from the vertical screen to the horizontal screen, the ratio of the second image data may also be adjusted from 1:2 to 2:1.

In a second manner, a target ratio input into the application program is received; the ratio of the second image data is adjusted to the target ratio.

The target ratio may be any ratio input by the user.

Certainly, the application may pre-set a condition of the target ratio to avoid the occurrence of unreasonable target ratio and affecting the display effect. When the target ratio input by the user satisfies the condition, the ratio of the second image data is adjusted to the target ratio; when the target ratio input by the user does not satisfy the condition, the ratio of the second image data is not adjusted.

The above condition may include at least one of: a condition of a value type and a condition of a value range. For example, the value range of the target ratio may be a range from 1:2 to 2:1; when the target ratio input by the user is 2:1, the ratio of the second image data may be adjusted to be 2:1; when the target ratio input by the user is 10:1, the ratio of the second image data may not be adjusted.

After the ratio of the second image data is adjusted, the ratio of the adjusted second image data might match or might not match the ratio of the first image data. If the ratio of the first image data is a ratio closest to the ratio of the second image data among the candidate ratios of the image acquisition device, the ratio of the first image data matches the ratio of the second image data; otherwise the ratio of the first image data does not match the ratio of the second image data.

When the ratio of the adjusted second image data matches the ratio of the first image data, the ratio of the first image data needn't be adjusted. After the ratio of the second image data is adjusted, the first image data may be re-captured using the ratio of the first image data. That is, the ratio of the first image data is the same before and after the ratio of the second image data is adjusted.

When the ratio of the adjusted second image data does not match the ratio of the first image data, a ratio that matches the ratio of the adjusted second image data may be selected from candidate ratios of the image acquisition device as the ratio of the first image data. That is, the ratio of the first image data is different before and after the ratio of the second image data is adjusted.

The ratio of the first image data is the ratio closest to the ratio of the adjusted second image data among the candidate ratios. In this way, it may be ensured that as many effective pixels as possible and as few ineffective pixels as possible are included in the first image data. The effective pixels are pixels in the second image data, and the ineffective pixels are pixel not in the second image data. In this way, ineffective pixels captured by the image acquisition device may be minimized, thereby reducing the computational complexity of the image acquisition device.

After the ratio of the first image data is adjusted above, the preview of the image acquisition device may also be restarted according to the adjusted ratio of the first image data, so as to enter the step of calling the image acquisition device to capture the first image data by the application program.

The restarted preview of the image acquisition device corresponds to the same ratio as the adjusted first image data, so that the re-captured first image data corresponds to the adjusted ratio. After the first image data is re-captured, it is necessary to continue the steps after S101.

With regard to the above-mentioned first manner, when the screen rotation angle is greater than or equal to the preset angle threshold, the ratio of the second image data is adjusted. After the ratio of the second image data is adjusted, a first angle may also be determined according to the screen rotation angle before performing the first processing on the second image data; a sum of the first angle and the screen rotation angle is 0 degrees or 360 degrees; the second image data is transposed according to the first angle.

Figure 5:
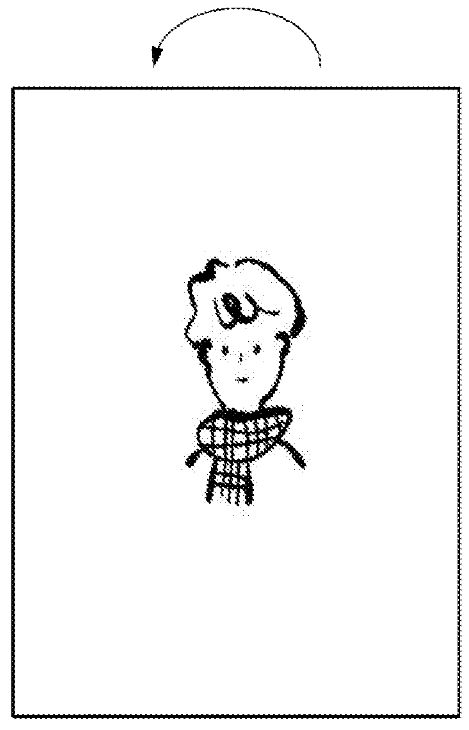
FIG. 5 through FIG. 7 schematically illustrate rotation of a screen of a terminal device provided by an embodiment of the present disclosure.
Figure 6:
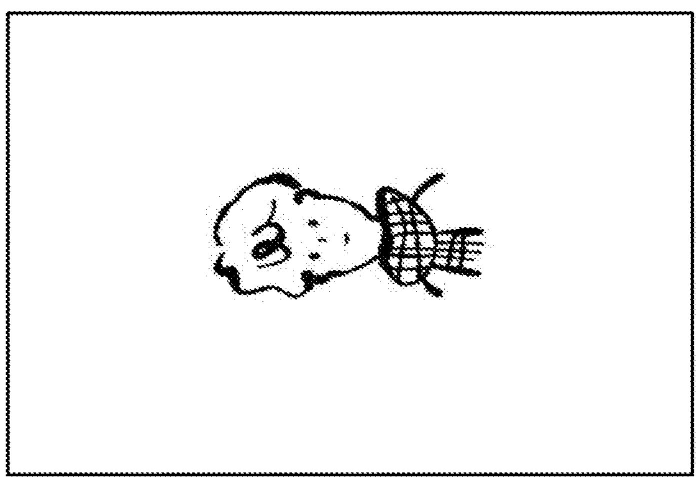
Figure 7:
Figure 7:
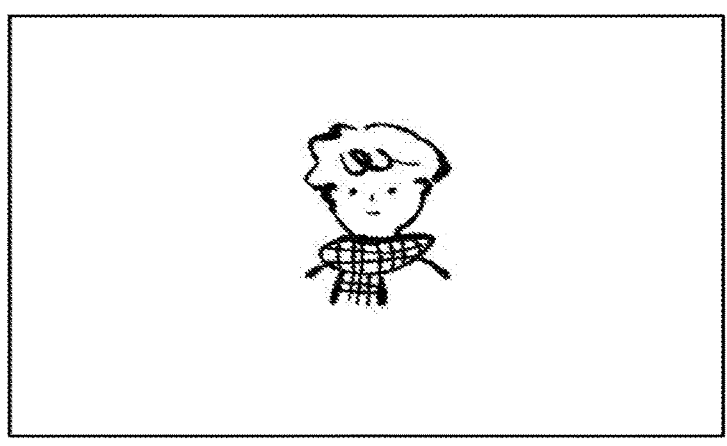

FIG. 5 through FIG. 7 schematically illustrate rotation of a screen of a terminal device provided by an embodiment of the present disclosure.

Referring to FIG. 5, the screen of the terminal device is in the vertical screen state, and the image captured by the image acquisition device is directly displayed on the screen in a vertical state. After the screen of the terminal device is rotated counterclockwise by 90 degrees to the horizontal screen state, since the image acquisition device is fixed on the terminal device, the capturing angle of the image acquisition device is also rotated counterclockwise by 90 degrees.

As shown in FIG. 6, after the capturing angle of the image acquisition device is rotated, the captured image is directly displayed on the screen in the transverse state. It can be seen that the displaying in FIG. 6 is not convenient for the user to view the image, so that after the screen of the terminal device is rotated, the image captured by the image acquisition device needs to be rotated reversely, i.e., the image data needs to be transposed. For example, when the screen of the terminal device is rotated counterclockwise by 90 degrees, the image captured by the image acquisition device needs to be rotated clockwise by 90 degrees, so that the image shown in FIG. 7 may be obtained after the screen of the terminal device shown in FIG. 5 is rotated.

As shown in FIG. 7, when the screen of the terminal device is rotated to the horizontal screen, the displayed image is still in the vertical state, so that the user may view the image conveniently.

Based on the above principle, the second image data, when obtained, needs to be rotated. The first image data corresponds to the image captured by the image acquisition device, and the second image data obtained in S102 corresponds to an image after the screen is rotated, so that the second image data may be transposed, namely, the image corresponding to the second image data is rotated by a first angle. The sum of the first angle and the screen rotation angle is 0 or 360 degrees, so that the image corresponding to the second image data is in the same horizontal or vertical state as before the rotation of the screen.

Figure 8:
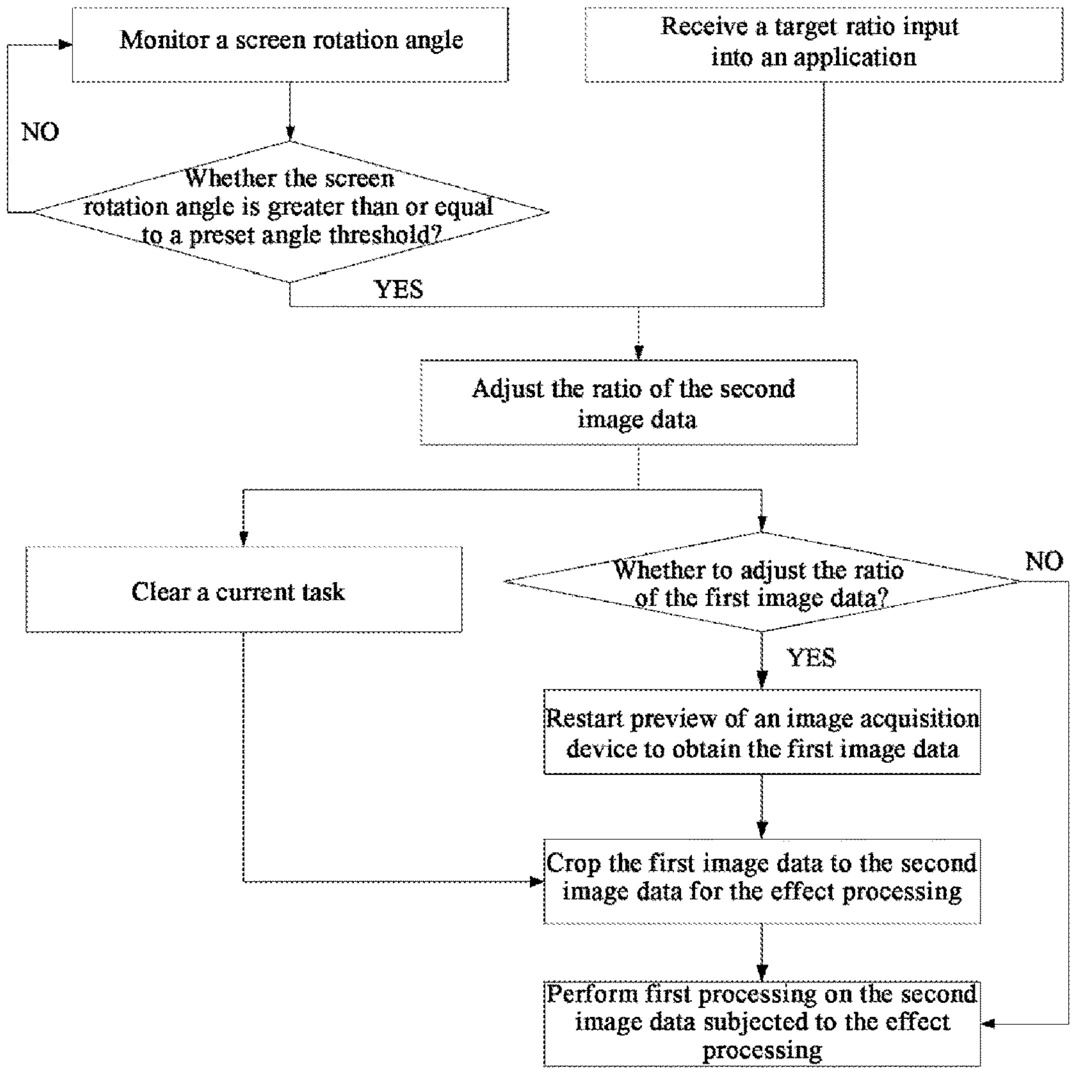
FIG. 8 schematically illustrates a detailed flowchart of an image processing method provided by an embodiment of the present disclosure.

FIG. 8 schematically illustrates a detailed flowchart of an image processing method provided by an embodiment of the present disclosure. The image processing method in FIG. 8 shows the relationship between the above-mentioned various processes. Referring to FIG. 8, on the one hand, the screen rotation angle may be monitored, and when the screen rotation angle is greater than or equal to a pre-set angle threshold, the ratio of the second image data is adjusted; on the other hand, it is possible to receive the target ratio inputted in the application and adjust the ratio of the second image data. Certainly, if the screen rotation angle is less than the preset angle threshold, the ratio of the second image data is not adjusted, and the monitoring is continued.

After the ratio of the second image data is adjusted, in one aspect, a current task may be cleared, including but not limited to: a conversion task of the current second image data, a rendering task of the current second image data, and cropping the first image data into the second image data. On the other hand, judgment is made as to whether to adjust the ratio of the first image data. When the ratio of the first image data is adjusted, the preview of the image acquisition device is restarted, the flow enters step S101 to re-capture the first image data, and steps S102 to S104 after S101 are executed. When the ratio of the first image data is not adjusted, step S104 is performed.

Figure 9:
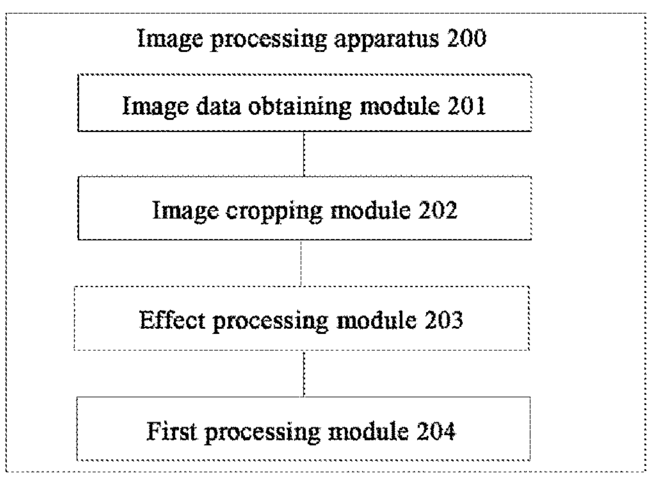
FIG. 9 schematically illustrates a block diagram of an image processing apparatus provided for an embodiment of the present disclosure.

Corresponding to the image processing method of the above embodiment, FIG. 9 schematically illustrates a block diagram of an image processing apparatus provided by an embodiment of the present disclosure. For ease of illustration, only portions related to the embodiment of the present disclosure are shown. Referring to FIG. 9, the image processing apparatus 200 comprises: an image data capturing module 201, an image cropping module 202, an effect processing module 203 and a first processing module 204.

The image data capturing module 201 is configured to call an image acquisition device by means of an application program to capture first image data.

The image cropping module 202 is configured to crop the first image data into second image data, a ratio of the first image data being different from that of the second image data, the ratio of the first image data being a ratio supported by the image acquisition device, and the ratio of the second image data being a ratio supported by the application program.

The effect processing module 203 is configured to perform effect processing on the second image data.

The first processing module 204 is configured to perform first processing on the second image data subjected to the effect processing, the first processing comprising at least one of displaying in an interface of the application, encoding and storing.

In one embodiment, the image cropping module 202 is further configured to: determine a target region in the first image data, the ratio of the target region being equal to that of the second image data; convert a texture of the target region from a first type to a second type to obtain second image data constituted by the target region, the first type being a texture type supported when the image acquisition device performs image displaying, and the second type being a texture type supported when the application program performs image displaying.

In one embodiment, if the ratio of the first image data is greater than that of the second image data, a height of the target region is the height of the first image data; if the ratio of the first image data is smaller than that of the second image data, a width of the target region is the width of the first image data.

In one embodiment, the image cropping module 202 is further configured to determine key image information included in the first image data; determine a region including the key image information in the first image data as the target region.

In one embodiment, the above apparatus further comprises a first ratio adjusting module configured to adjust the ratio of the second image data when a screen rotation angle is greater than or equal to a pre-set angle threshold before the first image data is crop into the second image data.

In one embodiment, the above apparatus further comprises a target ratio receiving module and a ratio adjusting module;

the target ratio receiving module is configured to receive a target ratio input into the application program before cropping the first image data into the second image data;

the second ratio adjusting module is configured to adjust the ratio of the second image data to the target ratio.

In one embodiment, the above apparatus further comprises a third ratio adjusting module configured to, if the ratio of the adjusted second image data does not match that of the first image data, select, from candidate ratios of the image acquisition device, a ratio that matches the ratio of the adjusted second image data as the ratio of the first image data.

In one embodiment, the above apparatus further comprises a cyclic processing module configured to, after selecting, from candidate ratios of the image acquisition device, an ratio that matches the ratio of the adjusted second image data as the ratio of the first image data, restart preview of the image acquisition device according to the adjusted ratio of the first image data, so as to enter the step of calling the image acquisition device by the application program to capture the first image data.

In one embodiment, the above apparatus further comprises a first angle determining module and an image transposing module:

the angle determining module is configured to determine a first angle according to the screen rotation angle before performing first processing on the second image data subjected to the effect processing, a sum of the first angle and the screen rotation angle being 0 degrees or 360 degrees;

the image transposing module is configured to transpose the second image data subjected to the effect processing according to the first angle.

The image processing apparatus provided in the present embodiment can be used to execute the technical solution of the above-mentioned method embodiment shown in FIG. 2. The implementation principles and technical effects of the image processing apparatus are similar to those of the method embodiment and will not be detailed in the present embodiment.

Figure 10:
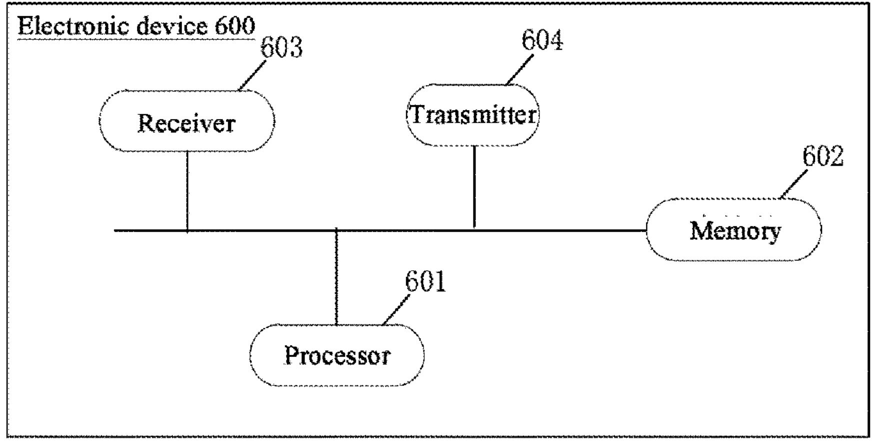
FIG. 10 and FIG. 11 schematically illustrate block diagrams of two types of electronic devices provided for embodiments of the present disclosure.

FIG. 10 is a block diagram of an electronic device 600 provided by an embodiment of the present disclosure. The electronic device 600 comprises a memory 602 and at least one processor 601.

The memory 602 stores computer-executable instructions therein.

The at least one processor 601 executes the computer-executable instructions stored in the memory 602 to cause the electronic device 601 to implement the method of FIG. 2.

In addition, the electronic device may further comprise a receiver 603 and a transmitter 604, wherein the receiver 603 is used for receiving information from remaining devices or apparatuses and forwarding the information to the processor 601, and the transmitter 604 is used for transmitting the information to the remaining devices or apparatuses.

Figure 11:
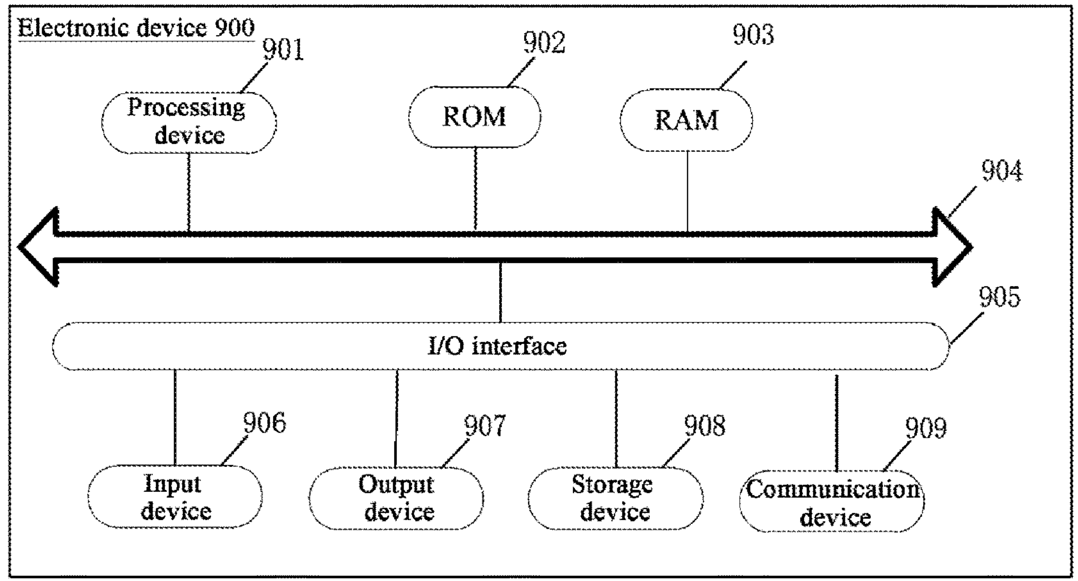

Furthermore, FIG. 11 shows a schematic structural diagram of an electronic device 900 according to an embodiment of the present disclosure. The electronic device 900 may be a terminal device. The terminal device may comprise, but not limited to, mobile terminals such as mobile phones, notebook computers, digital broadcast receivers, PDAs (Personal Digital Assistants), PADs (Tablet Computers), PMPs (Portable Multimedia Players), in-vehicle terminals (e.g., in-vehicle navigation terminals), etc. and fixed terminals such as digital TVs, desktop computers, etc. The electronic device shown in FIG. 11 is merely an example and should not impose any limitations on the functionality and scope of use of embodiments of the present disclosure.

As shown in FIG. 11, the electronic device 900 may comprise a processing device (e.g., a central processing unit, a graph processor, etc.) 901 that may perform various suitable actions and processes in accordance with a program stored in a read only memory (ROM) 902 or a program loaded from a storage device 908 into a random access memory (RAM) 903. In the RAM 903, various programs and data needed by the operation of the electronic device 900 are also stored. The processing device 901, the ROM 902, and the RAM 903 are connected to each other via a bus 904. An input/output (I/O) interface 905 is also coupled to bus 904.

In general, the following devices may be connected to the I/O interface 905: an input device 906 including, for example, a touch screen, a touch pad, a keyboard, a mouse, a camera, a microphone, an accelerometer, a gyroscope, etc.; an output device 907 including, for example, a liquid crystal display (LCD), a speaker, a vibrator, etc.; a storage device 908 including, for example, a magnetic tape, a hard disk, etc.; and a communication device 909. The communication device 909 may allow the electronic device 900 to communicate in a wireless or wired manner with other devices to exchange data. Although FIG. 11 illustrates the electronic device 900 having various devices, it is to be understood that not all illustrated devices are required to be implemented or provided. More or fewer devices may optionally be implemented or provided.

In particular, the processes described above with reference to flow charts may be implemented as computer software programs in accordance with embodiments of the present disclosure. For example, embodiments of the present disclosure comprise a computer program product comprising a computer program carried on a computer-readable medium, the computer program comprising program code for performing the method illustrated by the flow charts. In such embodiments, the computer program may be downloaded and installed from a network via the communication device 909, or installed from the storage device 908, or installed from the ROM 902. When the computer program is executed by the processing device 901, the above-described functions defined in the method of the embodiments of the present disclosure are performed.

It is appreciated that the computer-readable medium described above in the present disclosure may be either a computer-readable signal medium or a computer-readable storage medium, or any combination of the two. The computer-readable storage medium may be, for example but not limited to, an electronic, magnetic, optical, electromagnetic, infrared, or semiconductor system, apparatus, or device, or a combination of any of the above. More specific examples of the computer-readable storage medium may comprise, but are not limited to: an electrical connection having one or more wires, a portable computer magnetic disk, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the above. In the present disclosure, the computer-readable storage medium may be any tangible medium that contains or stores a program that may be used by or in conjunction with an instruction execution system, apparatus, or device. In the present disclosure, the computer-readable signal medium may comprise a data signal embodied in baseband or propagated as part of a carrier carrying computer-readable program code. Such propagated data signals may take many forms, including but not limited to, electromagnetic signals, optical signals, or any suitable combinations thereof. The computer-readable signal medium may also be any computer-readable medium other than a computer-readable storage medium that may send, propagate, or transport the program for use by or for use in conjunction with the instruction execution system, apparatus, or device. The program code contained on the computer-readable medium may be transmitted with any suitable medium including, but not limited to: electrical wire, optic cable, RF (radio frequency), and the like, or any suitable combinations thereof.

The computer readable medium may be contained in the above-described electronic device; it may also be present separately and not installed into the electronic device.

The computer readable medium carries one or more programs which, when executed by the electronic device, cause the electronic device to perform the method shown in the above embodiments.

The computer program code for carrying out operations of the present disclosure may be written in one or more programming languages or combinations thereof. The programming languages include, but not limited to, object-oriented programming languages, such as Java, smalltalk, C++, and conventional procedural programming languages, such as the "C" language or similar programming languages. The program code may be executed entirely on the user's computer, executed partly on the user's computer, executed as a stand-alone software package, executed partly on the user's computer and partly on a remote computer, or executed entirely on the remote computer or a server. In the case of the remote computer, the remote computer may be connected to the user's computer through any type of network, including a local area network (LAN) or a wide area network (WAN), or it may be connected to an external computer (e.g., through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special-purpose hardware and computer instructions.

The units described in connection with the embodiments disclosed herein may be implemented in a software or hardware manner. The names of the units do not constitute limitations of the units themselves in a certain case. For example, the first acquiring unit may also be described as "a unit for acquiring at least two internet protocol addresses".

The functions described herein above may be performed, at least in part, by one or more hardware logic components. For example, without limitation, exemplary types of hardware logic components that may be used comprise: a Field Programmable Gate Array (FPGA), an Application Specific Integrated Circuits (ASIC), an Application Specific Standard Products (ASSP), a Systems On Chip (SOC), a Complex Programmable Logic Device (CPLD), and so on.

In the context of the present disclosure, the machine-readable medium may be a tangible medium that may contain or store a program for use by or for use in conjunction with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combinations thereof. More specific examples of the machine-readable storage medium would comprise an electrical connection based on one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination thereof.

In a first example of the first aspect, embodiments of the present disclosure provide an image processing method, comprising:

- calling an image acquisition device by an application program to capture first image data;
- cropping the first image data into second image data, a ratio of the first image data being different from that of the second image data, the ratio of the first image data being a ratio supported by the image acquisition device, and the ratio of the second image data being a ratio supported by the application;
- performing effect processing on the second image data;
- performing first processing on the second image data subjected to the effect processing, the first processing comprising at least one of: displaying in an interface of the application, encoding and storing.

Based on the first example of the first aspect, in a second example of the first aspect, the cropping the first image data into second image data comprises:

- determining a target region in the first image data, the ratio of the target region being equal to that of the second image data;
- converting a texture of the target region from a first type to a second type to obtain second image data constituted by the target region, the first type being a texture type supported when the image acquisition device performs image displaying, and the second type being a texture type supported when the application performs image displaying.

Based on the second example of the first aspect, in a third example of the first aspect, if the ratio of the first image data is greater than that of the second image data, a height of the target region is the height of the first image data; if the ratio of the first image data is smaller than that of the second image data, a width of the target region is the width of the first image data.

Based on the second or third example of the first aspect, in a fourth example of the first aspect, the determining a target region in the first image data comprises:

- determining key image information included in the first image data;
- determining a region including the key image information in the first image data as the target region.

Based on the first example of the first aspect, in a fifth example of the first aspect, before cropping the first image data into second image data, the method further comprises:

- adjusting the ratio of the second image data when a screen rotation angle is greater than or equal to a pre-set angle threshold.

Based on the first example of the first aspect, in a sixth example of the first aspect, before cropping the first image data into second image data, the method further comprises:

- receiving a target ratio input into the application;
- adjusting the ratio of the second image data to the target ratio.

Based on the fifth or sixth example of the first aspect, in a seventh example of the first aspect, the method further comprises:

- if the ratio of the adjusted second image data does not match that of the first image data, selecting, from candidate ratios of the image acquisition device, a ratio that matches the ratio of the adjusted second image data as the ratio of the first image data.

Based on the seventh example of the first aspect, in an eighth example of the first aspect, after selecting, from candidate ratios of the image acquisition device, a ratio that matches the ratio of the adjusted second image data as the ratio of the first image data, the method further comprises:

- restarting preview of the image acquisition device according to the adjusted ratio of the first image data, so as to enter the step of calling the image acquisition device by the application program to capture the first image data.

Based on the fifth example of the first aspect, in a ninth example of the first aspect, before the performing first processing on the second image data subjected to the effect processing, the method further comprises:

- determining a first angle according to the screen rotation angle, a sum of the first angle and the screen rotation angle being 0 degrees or 360 degrees;
- transposing the second image data after the effect processing according to the first angle.

In a first example of a second aspect, there is provided an image processing apparatus, comprising:

- an image data capturing module configured to call an image acquisition device by an application program to capture first image data;
- an image cropping module configured to crop the first image data into second image data, a ratio of the first image data being different from that of the second image data, the ratio of the first image data being an ratio supported by the image acquisition device, and the ratio of the second image data being an ratio supported by the application;
- an effect processing module configured to perform effect processing on the second image data;
- a first processing module configured to perform first processing on the second image data subjected to the effect processing, the first processing comprising at least one of displaying in an interface of the application, encoding and storing.

Based on the first example of the second aspect, in a second example of the second aspect, the image cropping module is further configured to:

determine a target region in the first image data, the ratio of the target region being equal to that of the second image data;

convert a texture of the target region from a first type to a second type to obtain second image data constituted by the target region, the first type being a texture type supported when the image acquisition device performs image displaying, and the second type being a texture type supported when the application program performs image displaying.

Based on the second example of the second aspect, in a third example of the second aspect, if the ratio of the first image data is greater than that of the second image data, a height of the target region is the height of the first image data; if the ratio of the first image data is smaller than that of the second image data, a width of the target region is the width of the first image data.

Based on the second or third example of the second aspect, in a fourth example of the second aspect, the image cropping module is further configured to:

determine key image information included in the first image data;

determine a region including the key image information in the first image data as the target region.

Based on the first example of the second aspect, in a fifth example of the second aspect, the apparatus further comprises a first ratio adjusting module configured to adjust the ratio of the second image data when a screen rotation angle is greater than or equal to a pre-set angle threshold before the first image data is crop into the second image data.

Based on the first example of the second aspect, in a sixth example of the second aspect, the apparatus further comprises:

a target ratio receiving module configured to receive a target ratio input into the application before cropping the first image data into the second image data;

a second ratio adjusting module configured to adjust the ratio of the second image data to the target ratio.

Based on the fifth or sixth example of the second aspect, in a seventh example of the second aspect, the apparatus further comprises a third ratio adjusting module configured to, if the ratio of the adjusted second image data does not match that of the first image data, select, from candidate ratios of the image acquisition device, a ratio that matches the ratio of the adjusted second image data as the ratio of the first image data.

Based on the seventh example of the second aspect, in an eighth example of the second aspect, the apparatus further comprises a cyclic processing module configured to, after selecting, from candidate ratios of the image acquisition device, an ratio that matches the ratio of the adjusted second image data as the ratio of the first image data, restart preview of the image acquisition device according to the adjusted ratio of the first image data, so as to enter the step of calling the image acquisition device by the application program to capture the first image data.

Based on the fifth example of the second aspect, in a ninth example of the second aspect, the above apparatus further comprises:

first angle determining module configured to determine a first angle according to the screen rotation angle before performing first processing on the second image data subjected to the effect processing, a sum of the first angle and the screen rotation angle being 0 degrees or 360 degrees;

an image transposing module configured to transpose the second image data after the effect processing according to the first angle.

In a third aspect, according to one or more embodiments of the present disclosure, there is provided an electronic device comprising: at least one processor and a memory;

the memory stores computer-executable instructions;

the at least one processor executes the computer-executable instructions stored in the memory, to cause the electronic device to implement the method of any of the examples of the first aspect.

In a fourth aspect, according to one or more embodiments of the present disclosure, there is provided a computer-readable storage medium having stored therein computer-executable instructions which, when executed by a processor, cause a computing device to implement the method of any of examples of the first aspect.

In a fifth aspect, according to one or more embodiments of the present disclosure, there is provided a computer program for implementing the method of any of examples of the first aspect.

In a sixth aspect, according to one or more embodiments of the present disclosure, there is provided a computer program product comprising computer instructions for implementing the method of any of examples of the first aspect.

What are described above are only preferred embodiments of the present disclosure and illustrate the technical principles employed. It will be appreciated by those skilled in the art that the scope of the present disclosure is not limited to technical solutions formed by specific combinations of the above technical features, and meanwhile should also comprise other technical solutions formed by any combinations of the above technical features or equivalent features thereof, for example, technical solutions formed by replacement of the above technical features with technical features having similar functions disclosed by the present disclosure.

In addition, while operations are depicted in a particular order, this should not be understood as requiring that the operations be performed in the particular order shown or in a sequential order. In certain circumstances, multitasking and parallel processing may be advantageous. As such, while several specific implementation details have been included in the above discussion, these should not be construed as limiting the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims.

What is claimed is:

1. An image processing method, comprising:

calling an image acquisition device by an application program to obtain first image data;

adjusting a ratio to be used for second image data in response to a screen rotation angle being greater than or equal to a pre-set angle threshold;

cropping the first image data to the second image data, wherein a ratio of the first image data is different from a ratio of the second image data, the ratio of the first image data is a ratio supported by the image acquisition device, and the ratio of the second image data is a ratio supported by the application program;

performing effect processing on the second image data; and performing first processing on the second image data subjected to the effect processing, wherein the first processing comprises at least one of displaying in an interface of the application program, encoding and storing.

2. The method according to claim 1, wherein cropping the first image data to the second image data comprises:

determining a target region in the first image data, wherein a ratio of the target region is equal to the ratio of the second image data; and converting a texture of the target region from a first type to a second type to obtain the second image data constituted by the target region, wherein the converting comprises the cropping for the first image data, the first type is a texture type supported when the image acquisition device performs image displaying, and the second type is a texture type supported when the application program performs image displaying.

3. The method according to claim 2, wherein in response to the ratio of the first image data being greater than the ratio of the second image data, a height of the target region is a height of the first image data;

in response to the ratio of the first image data being smaller than the ratio of the second image data, a width of the target region is a width of the first image data.

4. The method according to claim 2, wherein determining the target region in the first image data comprises:

determining key image information included in the first image data; and determining a region including the key image information in the first image data as the target region.

5. The method according to claim 1, wherein before performing the first processing on the second image data subjected to the effect processing, the method further comprises:

determining a first angle according to the screen rotation angle, wherein a sum of the first angle and the screen rotation angle is 0 degrees or 360 degrees; and transposing the second image data subjected to the effect processing according to the first angle.

6. The method according to claim 1, wherein before cropping the first image data to the second image data, the method further comprises:

receiving a target ratio input into the application program; and adjusting the ratio to be used for the second image data to the target ratio.

7. The method according to claim 6, further comprising:

in response to the adjusted ratio to be used for the second image data not matching the ratio of the first image data, selecting, from candidate ratios of the image acquisition device, a ratio that matches the adjusted ratio to be used for the second image data as the ratio of the first image data.

8. The method according to claim 7, wherein after selecting, from the candidate ratios of the image acquisition device, the ratio that matches the adjusted ratio to be used for the second image data as the ratio of the first image data, the method further comprises:

restarting preview of the image acquisition device according to an adjusted ratio of the first image data, thereby entering the step of calling the image acquisition device by the application program to obtain the first image data.

9. An electronic device, comprising: at least one processor and a memory;

the memory storing computer-executable instructions;

the at least one processor executing the computer-executable instructions stored in the memory, to cause the electronic device to perform operations comprising:

calling an image acquisition device by an application program to obtain first image data;

adjusting a ratio to be used for second image data in response to a screen rotation angle being greater than or equal to a pre-set angle threshold;

cropping the first image data to the second image data, wherein a ratio of the first image data is different from a ratio of the second image data, the ratio of the first image data is a ratio supported by the image acquisition device, and the ratio of the second image data is a ratio supported by the application program;

performing effect processing on the second image data; and performing first processing on the second image data subjected to the effect processing, wherein the first processing comprises at least one of displaying in an interface of the application program, encoding and storing.

10. The electronic device according to claim 9, wherein cropping the first image data to the second image data comprises:

determining a target region in the first image data, wherein a ratio of the target region is equal to the ratio of the second image data; and converting a texture of the target region from a first type to a second type to obtain the second image data constituted by the target region, wherein the converting comprises the cropping for the first image data, the first type is a texture type supported when the image acquisition device performs image displaying, and the second type is a texture type supported when the application program performs image displaying.

11. The electronic device according to claim 10, wherein in response to the ratio of the first image data being greater than the ratio of the second image data, a height of the target region is a height of the first image data;

in response to the ratio of the first image data being smaller than the ratio of the second image data, a width of the target region is a width of the first image data.

12. The electronic device according to claim 10, wherein determining the target region in the first image data comprises:

determining key image information included in the first image data; and determining a region including the key image information in the first image data as the target region.

13. The electronic device according to claim 9, wherein before performing the first processing on the second image data subjected to the effect processing, the operations further comprise:

determining a first angle according to the screen rotation angle, wherein a sum of the first angle and the screen rotation angle is 0 degrees or 360 degrees; and transposing the second image data subjected to the effect processing according to the first angle.

14. The electronic device according to claim 9, wherein before cropping the first image data to the second image data, the operations further comprise:

receiving a target ratio input into the application program; and adjusting the ratio to be used for the second image data to the target ratio.

15. The electronic device according to claim 14, wherein the operations further comprise:

in response to the adjusted ratio to be used for the second image data not matching the ratio of the first image data, selecting, from candidate ratios of the image acquisition device, a ratio that matches the adjusted ratio to be used for the second image data as the ratio of the first image data.

16. The electronic device according to claim 15, wherein after selecting, from the candidate ratios of the image acquisition device, the ratio that matches the adjusted ratio to be used for the second image data as the ratio of the first image data, the operation further comprise:

restarting preview of the image acquisition device according to an adjusted ratio of the first image data, thereby entering the step of calling the image acquisition device by the application program to obtain the first image data.

17. A non-transitory computer-readable storage medium having stored therein computer-executable instructions which, when executed by a processor, cause a computing device to perform operations comprising:

calling an image acquisition device by an application program to obtain first image data;

adjusting a ratio to be used for second image data in response to a screen rotation angle being greater than or equal to a pre-set angle threshold;

cropping the first image data to the second image data, wherein a ratio of the first image data is different from a ratio of the second image data, the ratio of the first image data is a ratio supported by the image acquisition device, and the ratio of the second image data is a ratio supported by the application program;

performing effect processing on the second image data; and performing first processing on the second image data subjected to the effect processing, wherein the first processing comprises at least one of displaying in an interface of the application program, encoding and storing.

18. The non-transitory computer-readable storage medium according to claim 12, wherein cropping the first image data to the second image data comprises:

determining a target region in the first image data, wherein a ratio of the target region is equal to the ratio of the second image data; and converting a texture of the target region from a first type to a second type to obtain the second image data constituted by the target region, wherein the converting comprises the cropping for the first image data, the first type is a texture type supported when the image acquisition device performs image displaying, and the second type is a texture type supported when the application program performs image displaying.

* * * * *